Nov. 1, 1932.   R. THOMSON   1,886,273

SHEARS

Filed June 24, 1931

INVENTOR
Robert Thomson
BY
ATTORNEYS.

Patented Nov. 1, 1932

1,886,273

UNITED STATES PATENT OFFICE

ROBERT THOMSON, OF ARLINGTON, NEW JERSEY, ASSIGNOR TO DARDELET THREAD-LOCK CORPORATION, OF NEW YORK, N. Y., A CORPORATION OF DELAWARE

SHEARS

Application filed June 24, 1931. Serial No. 546,503.

Important objects of the present invention are, to provide shears having an improved pivotal connection designed to improve their operation; to provide shears having a pivotal connection designed to improve the shearing coaction of the blades and at the same time render the shears easy to open; to provide shears having a pivotal connection designed to materially reduce wear and strain upon the pivot; and to provide shears having a pivot embodying a thoroughly reliable self-locking thread feature for maintaining the adjustment thereof. Other objects of the invention will appear hereinafter.

Figure 1:
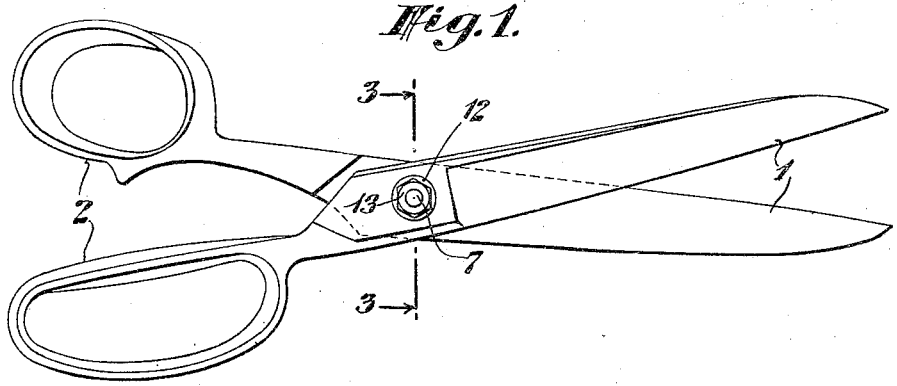
Figure 2:
Figure 3:
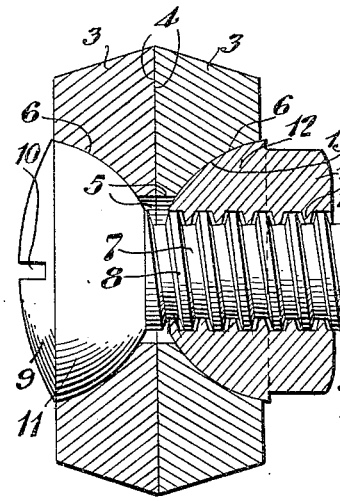
Figure 4:
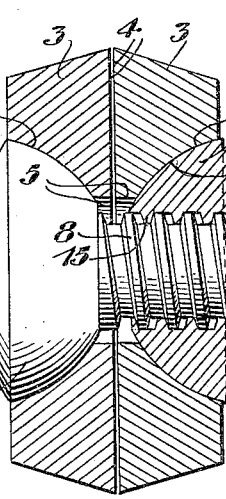
Figure 5:
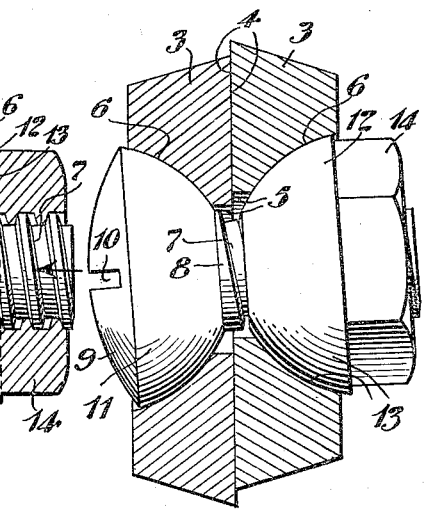

In the drawing, Fig. 1 is a side view of a pair of shears embodying my invention;

Fig. 2 an edge view of a portion of the shears upon a larger scale;

Fig. 3 an enlarged transverse section taken on the line 3—3 of Fig. 1 showing a preliminary adjustment of the parts in the course of assembling them;

Fig. 4 a view similar to Fig. 3 showing the final working adjustment of the parts; and Fig. 5 a view similar to Figs. 3 and 4 showing the pivoted members displaced slightly with the pivot tilted and the pivoted parts drawn thereby into close contact for effective shearing coaction of the blades.

My improved pivotal connection is shown as embodied in shears of the type used by tailors. The pivotal connection may, however, be satisfactorily employed in other types of shears.

The shears illustrated are of a standard form comprising pivoted members forming coacting blades 1 and handles 2, at the opposite sides of the pivot. Each blade is formed with a longitudinally extending cutting edge. When the shear blades are in closed position they lie side by side in overlapping relation, but in open position their cutting edges cross each other. The cutting edges engage and wipe across each other progressively for a shearing cut as the blades are closed by a pivotal movement into overlapping relation. As shown in Fig. 2 the blades are laterally bowed or splayed slightly in opposite directions for shearing coaction.

The pivoted medial portions 3 of the two shear members are flat and of identical form in cross section and have flat, opposed inner bearing faces 4 which are continuous with the inner faces of the blades. Said medial portions are formed with registering pivot apertures 5 at their inner faces and with concave, spherical pivot head seats 6 countersunk in their outer faces.

The apertured medial portions of the shear members are pivotally secured together by a bolt. The latter has a shank 7 passed through the registering apertures and formed with a thread 8, and with a head 9 at one end. The head in the present instance has a slightly convex outer face, slotted as at 10 to receive a screw driver, and a convex spherical inner face 11 rotatably fitted in one of the concave seats 6. Screwed upon the bolt shank is a nut 12 also having a convex spherical inner face 13 rotatably fitted in the other seat 6. At its outer face the nut has a projecting polygonal portion 14 engageable by a wrench. The concave seats and the convex bolt head and nut faces are preferably all struck with the same or substantially the same radius, and the centers of curvature of the concave seats are preferably so spaced that the opposed curvatures of the two seats are substantially tangential at a point upon the pivot axis midway between the seats. The pivot heads formed by the bolt head and nut are fitted for universal rotation in the concave seats and the latter together with the spherical surfaces of the pivot heads and the bearing faces 4, are finished and lapped to reduce friction to a minimum. The apertures 5 are materially greater diameter than the pivot shank to avoid contact with the latter upon transverse displacement of the pivoted parts and tilting of the pivot.

The bolt thread 8 and the engaged thread 15 of the nut are complementary threads of constant pitch and as shown are preferably the well known self-locking Dardelet type of screw threads shown in U. S. Patent No. 1,657,244. The crest of thread 15 and the root of thread 8 slope inward toward the bolt head and make an angle of preferably six degrees with the thread axis, this being within the angle of friction of the metals in contact. The ribs of the threads are much narrower than the grooves so that the threads are relatively displaceable one across the other for self-locking mutual engagement of their inclined crest and root surfaces. At their opposite sides the thread ribs have abutment faces making an abrupt angle with the thread axis.

The parts of the shears are assembled by disposing the shear members with the apertures 5 in register, inserting the bolt shank and screwing on the nut. The nut is screwed on until the spherical faces of the bolt head and nut are fully seated and the opposed bearing faces 4 are drawn firmly together. This stops axial relative advance of the bolt and nut and, upon further turning of the nut, the threads are relatively displaced one across the other to bring the sloping crest and root locking surfaces into partial wedging self-locking engagement, as shown in Fig. 3. Then, the exposed end of the bolt shank is tapped to drive the pivot bolt in a reverse direction to that of its insertion. This completes the tight-holding wedging engagement of the threads and brings opposed faces thereof into abutment, as shown in Fig. 4. At the same time said slight axial reverse movement of the bolt serves to relieve the pressure upon the opposed bearing surfaces 4 and permit the pivoted members to separate slightly for easy operation.

The design of the pivot structure, with its spherical pivot heads fitted in spherical seats for universal rotation renders the pivot floating and self-adjusting and permits relative displacement of the medial portions 3 of the shearing members laterally of the pivot without any binding or cramping effect at the pivot and without severe unscrewing strain upon the nut. An important advantage is obtained by the provision of such a pivotal connection in shears. In the operation of shears it is most desirable that the shears open easily and also that the blades should come close together in their closing movement for effective shearing coaction. The present shears are designed for such desirable operation. As will be seen in Fig. 4, there is clearance at the pivotal connection which provides free working play and permits the shears to be opened without effort. When the shears are closed however during a shearing operation the resistance of the work between the blades and the opposing pressure upon the handles causes a relative displacement of the pivoted shearing members transversely of the pivot, as shown in Fig. 5. This displacement causes the freely floating pivot to tilt, with a consequent foreshortening thereof in a direction at right angles to the opposed surfaces 4, so that the tilted pivot draws and holds the pivoted members close together for effective shearing coaction of the blades. The medial portions 3 of the pivoted members are free of edge obstructions and the only limit to said relative displacement thereof transversely of the pivot is the desired mutual contact of the surfaces 4. The floating pivot freely permits this displacement.

In the cutting of thick, tough fabric by tailor's shears there is a tendency for the fabric to fold between the blades, wedge the blades apart and avoid shearing. The present cooperation of the freely floating pivot, the free displacement of the pivoted members transversely of the pivot and the contracting effect of the pivot, act to prevent said difficulty and ensure positive shearing action. The pivotal connection is also designed for quick and easy assembly, accurate working adjustment, easy readjustment to take up wear, and positive maintenance of adjustment by the thread-locking feature and by the avoidance of unlocking strain.

What I claim is:

1. A pair of shears comprising blade and handle members pivoted together with the blades in overlapped relation when closed and shiftable to place their cutting edges in crossed relation, the pivotal portions of said members having registering pivot apertures, and concave spherical pivot head seats at their outer faces each blade having a longitudinally extending cutting edge and said cutting edges being adapted to wipe across each other progressively as said blades are moved from open position into closed overlapping relation, and a pivot comprising a bolt having a threaded shank inserted through said registering apertures and a head having a convex, spherical inner face fitted for universal rotation in one of said concave seats, and a nut screwed upon the bolt shank and having a convex, spherical inner face fitted for universal rotation in the other concave seat, the pivot being universally tiltable by rotation of said convex faces in the seats, and the pivoted portions being freely shiftable transversely of the pivot relatively to each other upon shearing resistance of work between the blades to tilt and foreshorten the pivot and thereby cause the pivot to draw them close together for effective shearing coaction of the blades.

2. A pair of shears comprising blade and handle members pivoted together with the blades in overlapped relation when closed and shiftable to place their cutting edges in crossed relation, the pivoted portions of the said members having registering pivot apertures, and concave, spherical pivot head seats at their outer faces; each blade having a longitudinally extending cutting edge and said cutting edges being adapted to wipe across each other progressively as said blades are moved from open position into closed overlapping relation, and a pivot extending through said registering apertures and having heads formed with convex, spherical inner faces fitted for universal rotation in said seats, the pivot being universally tiltable by rotation of said convex faces of the heads in the seats and the pivoted portions of said blade and handle members being freely shiftable transversely of the pivot relatively to each other upon shearing resistance of work between the blades to tilt and foreshorten the pivot and thereby cause the pivot to draw said members close together for effective shearing coaction of the blades.

3. A pair of shears comprising blade and handle members pivoted together with the blades in overlapped relation when closed and shiftable to place their cutting edges in crossed relation, when open, the pivoted portions of said members having registering pivot apertures, and concave, spherical pivot head seats at their outer faces; each blade having a longitudinally extending cutting edge and said cutting edges being adapted to wipe across each other progressively as said blades are moved from open position into closed overlapping relation; and a pivot having a threaded shank inserted through said registering apertures and provided with a head having a convex, spherical inner face fitted for universal rotation in one of said seats, and a nut screwed upon said shank and having a convex, spherical inner face fitted for universal rotation in the other seat, the engaged threads of the bolt and nut having clearance for transverse relative displacement and being formed to coact for self-locking mutual engagement by said displacement, the pivot being universally tiltable by rotation of convex faces of the head and nut in the seats and the pivoted portions of said blade and handle members being freely shiftable relatively to each other transversely of the pivot upon shearing resistance of work between the blades to tilt and foreshorten the pivot and thereby cause it to draw said members close together for effective shearing coaction of the blades.

4. A pair of shears comprising blade and handle members pivoted together with the blades in overlapped relation when closed and shiftable to place their cutting edges in crossed relation when open, the pivoted portions of said members having registering pivot apertures and concave pivot head seats; each blade having a longitudinally extending cutting edge and said cutting edges being adapted to wipe across each other progressively as said blades are moved from open position into closed overlapping relation, and a pivot extending through said registering apertures and tiltable therein and having heads with convex inner faces rotatably fitted in said seats, said fitting inner head faces and seats being curved longitudinally of the pivot to permit rotation of the heads for tilting the pivot, and the pivoted portions being shiftable transversely of the pivot relatively to each other upon shearing resistance of work between the blades, to tilt and foreshorten the pivot and thereby cause the pivot to draw the blades together for effective shearing coaction.

5. A pair of shears comprising blade and handle members pivoted together with the blades in overlapped relation when closed and shiftable to place their cutting edges in crossed relation, the pivoted portions of said members having registering pivot apertures and concave pivot head seats; each blade having a longitudinally extending cutting edge and said cutting edges being adapted to wipe across each other progressively as said blades are moved from open position into closed overlapping relation; and a pivot having a threaded shank inserted through said registering apertures and tiltable therein and provided with a head having a convex inner face fitted in one of said seats; and a nut screwed upon said shank and having a convex inner face fitted in the other seat, the engaged threads of the bolt and nut having clearance for transverse relative displacement axially of the pivot and being formed to coact for self-locking mutual engagement by said displacement, said fitting seats and head and nut faces being curved longitudinally of the pivot to permit rotation of the head and nut for tilting the pivot and the pivoted portions being shiftable transversely of the pivot relatively to each other upon shearing resistance of work between the blades, to tilt and foreshorten the pivot and thereby cause the pivot to draw the blades together for effective shearing coaction.

In testimony whereof I hereunto affix my signature.

ROBERT THOMSON.